United States Patent [19]

Safonnikov et al.

[11] 4,454,406
[45] Jun. 12, 1984

[54] METHOD, WELDING FLUX, AND APPARATUS FOR ELECTROSLAG WELDING

[75] Inventors: Anatoly N. Safonnikov; Anatoly V. Antonov, both of Kiev, U.S.S.R.

[73] Assignee: Institut Elektrosvarki Imeni E.O. Patona Akademii Nauk Ukrainskoi SSR, Kiev, U.S.S.R.

[21] Appl. No.: 355,584

[22] PCT Filed: Jun. 26, 1980

[86] PCT No.: PCT/SU80/00107
§ 371 Date: Feb. 23, 1982
§ 102(e) Date: Feb. 23, 1982

[87] PCT Pub. No.: WO82/00016
PCT Pub. Date: Jan. 7, 1982

[51] Int. Cl.³ .................... B23K 9/18; B23K 25/00
[52] U.S. Cl. ............................ 219/73.1; 219/73.2
[58] Field of Search ............... 219/73.1, 73.2, 73, 219/126, 120

[56] References Cited

U.S. PATENT DOCUMENTS

| | | | |
|---|---|---|---|
| 2,802,762 | 8/1957 | Stetson | 148/26 |
| 3,529,126 | 9/1970 | Reeh | 219/120 |
| 3,585,343 | 6/1971 | Crichton | 219/73 |
| 4,207,454 | 6/1980 | Safonnikov et al. | 219/73.1 |
| 4,376,881 | 3/1983 | Safonnikov et al. | 219/73.1 |

FOREIGN PATENT DOCUMENTS

| | | | |
|---|---|---|---|
| 2393646 | 1/1979 | France | |
| 626913 | 9/1978 | U.S.S.R. | |
| 651921 | 3/1979 | U.S.S.R. | 219/73.1 |

OTHER PUBLICATIONS

"The Technology of Electric Fusion Welding of Metals and Alloys", Paton, B. E.
"Electroslag Welding", Edited by B. E. Paton, Moscow-Kiev, Mashgiz, 1959, pp. 90-149.

Primary Examiner—Bruce A. Reynolds
Assistant Examiner—Catherine Sigda
Attorney, Agent, or Firm—Fleit, Jacobson, Cohn & Price

[57] ABSTRACT

The invention provides a method for electroslag welding of light metals, which includes establishing a slag bath, fusing an electrode and edges to be weld-joined, and filling with molten metal the gap between the edges, the weld metal being held in a liquid state after switching off the welding current with concurrently increasing the slag bath heat capacity.

The method employs a flux of the following composition (in wt. %):

| | |
|---|---|
| barium fluoride | 60.0 to 90.0 |
| calcium fluoride | 5.0 to 15.0 |
| lithium fluoride | 1.0 to 5.0 |
| sodium fluoride | 1.0 to 10.0 |
| potassium fluoride | 1.0 to 15.0 |

The apparatus for carrying out the method for electroslag welding comprises a metal mould 1 with a bottom plate 5, moulding shoes 4, a welding electrode 6, and a current lead member 8, 20, the welding electrode 6 being installed in an aperture in the center of the bottom plate 5 and the current lead member 8, 20 having a low electrical resistance being installed in the welding electrode fusion zone.

The proposed electroslag welding method, flux, and apparatus allow a welded joint with a sound weld metal to be produced.

9 Claims, 4 Drawing Figures

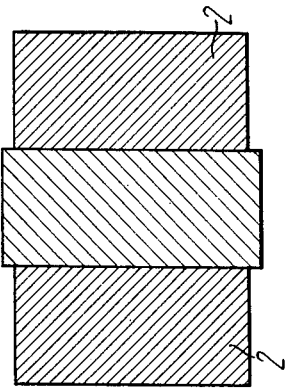
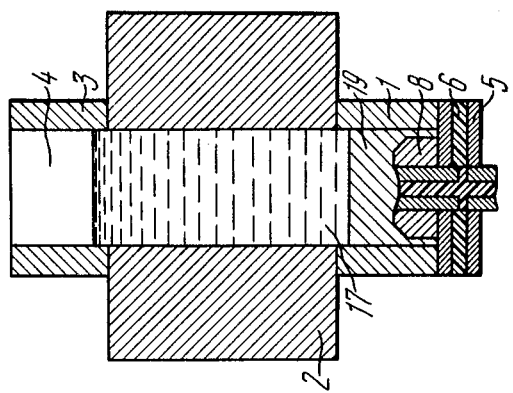

METHOD, WELDING FLUX, AND APPARATUS FOR ELECTROSLAG WELDING

TECHNICAL FIELD

The present invention relates to the art of welding and more particularly to a method for electroslag welding of light metals and alloys with a density less than that of the slag, to a welding flux based on alkali and alkali-earth metal halides and apparatus for accomplishing said method.

BACKGROUND ART

The invention may be employed in welding aluminium, magnesium, titanium, their alloys, and other light metals; it is particularly useful for welding aluminium busbars in the nonferrous metallurgy, chemical and electrical industries, and in other fields of engineering.

There is known a method for electroslag welding of metals (Elektroshlakovaja svarka, Ed. by B. E. Paton. Moscow-Kiev, "Mashgiz", 1959, pp. 90-149), which includes establishing a slag bath, fusing the electrode and the edges being weld-joined, and filling with molten metal the gap between the edges.

There is also known that in the course of electroslag welding of light metals and alloys with the use of prior art fluxes, the content of gases in the weld metal rises with the thickness of the workpieces being weld-joined.

For example, a flux has been proposed (USSR Inventor's Certificate No. 626,913, published Mar. 28, 1977), intended for electroslag welding of light metals and alloys and containing alkali and alkali-earth metal halides, the flux composition being as follows (in wt.%):

| calcium fluoride | 13-17 |
|---|---|
| strontium fluoride | 13-17 |
| magnesium fluoride | 10-14 |
| lithium fluoride | 16-20 |
| potassium fluoride (concentrated aqueous solution) | 36-44 |

A weld produced with the use of the flux in the course of welding, without resorting to known techniques for reducing the gas content in the weld metal, is unsound, with an increased content of gases, which drastically impairs the mechanical properties of welded joints. Furthermore, the flux is highly hygroscopic (because its composition includes a concentrated aqueous solution of potassium fluoride), which in the course of electroslag welding may give rise to weld pool splashouts upsetting the stability of the process.

The above-mentioned electroslag welding method contemplates the use of apparatus consisting of a bottom plate, moulding shoes, run-on plates, and a welding electrode.

The use of such methods, flux, and apparatus results in welds featuring an increased content of gas and calls for additional processing operations to upgrade the weld quality in welding critical structures.

A full degassing of the weld metal in the above method can be attained with inhibiting the weld metal crystallization process by performing an additional operation of a preliminary, accompanying, and subsequent heating of the weld metal, which is attainable only by the use of a complex additional equipment.

Moreover, the method calls for introduction in the course of welding into the weld metal of additional chemical elements which bind the gas-forming components into stable compounds and for an additional protection of the welding zone by inert gases.

The application of said method, flux, and apparatus with the additional processing steps greatly increases the labour consumption and the cost of the welding process.

There has also been proposed a method for vertical welding of aluminium (U.S. Pat. No. 3,585,343, published June 15, 1971), which includes (1) establishing a slag bath of the following composition; (2) formation of a slag bath (pool) (in wt. %):

| potassium chloride | 45 |
|---|---|
| sodium chloride | 27 |
| sodium cryolite ($3NaF.AlF_3$) | 22 |
| lithium chloride | 6, | followed by fusing the electrode and the edges being weld-joined and filling with metal the gap between the edges.

The above flux allows a stable electroslag welding process to be conducted, adequately deoxidizes an oxide film on the workpieces being weld-joined, but fails to ensure sound welds unless the above-mentioned weld metal degassing techniques are resorted to.

The method contemplates the use of an apparatus comprising a metal mould, graphite moulding shoes, current lead members, and a solid-section electrode with a guide bushing which provides twisting the electrode and its rotation in the slag bath; the current lead members are disposed outside the weld pool.

Degassing the weld in the course of welding proceeds owing to the use of the graphite moulding shoes which reduce the heat removal from the weld pool as well as to the electrode rotation in the slag bath.

Because of a high rate of the weld metal crystallization as well as of that the electrode rotation exerts a mechanical effect on the slag bath alone in the course of welding, this prior art method is incapable of fully degassing the weld metal.

The electroslag welding method with the use of the above-described flux and apparatus requires a complex follow-up equipment to ensure stability of the process through controlling the electrode disposition in the weld pool, which complicates the process, raises its cost, and still fails to fully remove gases from the weld metal before its crystallization because of a low melting point of the flux.

The object of the invention is to provide a method, a welding flux, and an apparatus for electroslag welding of light metals and alloys thereof which ensure a stable welding process and minimize gas content in the weld metal by self-regulation of the electrode fusion rate and which also ensure removal of gases from the weld pool both in the course of the welding process and solidification rate and changing the quantitative and qualitative composition of the flux being used.

These and other objects are attained by that in a method for electroslag welding of light metals and alloys, which includes establishing a slag bath, fusing the electrode and the edges being weld-joined, and filling with the metal being fused the gap between the edges, according to the invention, the weld metal is held in a liquid state after switching off the welding current and the heat capacity is raised concurrently, the weld metal being held in a liquid state for a time 10-15% longer than the weld metal full degassing time determined experimentally before the welding.

This allows a weld joint with a sound weld metal to be obtained.

The slag bath heat capacity may be raised, according to the invention, by increasing the bath volume. This slows down the rate of weld metal cooling in the course of welding.

To raise the slag bath heat capacity, according to the invention, a flux of the following composition (in wt. %) is used:

| barium fluoride | 60.0 to 90.0 |
| calcium fluoride | 5.0 to 15.0 |
| lithium fluoride | 1.0 to 5.0 |
| sodium fluoride | 1.0 to 10.0 |
| potassium fluoride | 1.0 to 15.0 |

Incorporation of barium fluoride in the above-specified amounts into the proposed flux increases the flux density above that of the metal being welded, and thereby facilitates separation of molten metal from slag in the course of electroslag welding as well as provides the stability of the process.

Reducing the barium fluoride content in the proposed flux below the specified lower limit leads to a poor separation of molten metal from slag in the process and impairs the stability of the latter, whereas exceeding the specified upper limit reduces the activity of the flux and thus results in a poor deoxidation of the edges being weld-joined and eventually in weld defects.

Incorporation of calcium fluoride in the above-specified amounts into the composition of the proposed flux augments the activity of the latter and also, through reducing the surface tension at the slag-metal interface promotes the merging of individual liquid metal drops into one metal pool in the course of electroslag welding. Reducing or increasing the calcium fluoride content in the proposed flux composition beyond the above-specified range degrades the activity of the flux.

Lithium, sodium, and potassium fluorides contained in the above-specified amounts in the composition of the proposed flux as well enhance its activity.

The above-specified percentages of the flux components raise the flux melting point above that of the metal being welded, which results in inhibiting the crystallization of the molten metal in the gap between the edges being weld-joined and hence in a higher degree of degassing the metal and in producing a sound weld. The above advantages of the proposed flux allow the quality and operational dependability of welded joints to be greatly enhanced.

Increasing the heat capacity of the slag bath and holding the weld metal in a liquid state till its full degassing in accordance with the proposed method are attained with the use of an apparatus which includes a metal mould with a bottom plate, moulding shoes, a current lead member, and a welding electrode, in which apparatus, according to the invention, the welding electrode is installed through an aperture in the bottom plate centre and a low-resistance current lead member is installed in the electrode fusion zone.

Such an arrangement provides the stability of the welding process owing to a self-regulation of the welding electrode fusion rate, since when the electrode end gets fused down below the top plane of the current lead member, the arc spot shifts from the electrode to the current lead member, thereby slowing down the electrode fusion rate.

The current lead member installed in the electrode fusion zone may be made, according to the invention, of either a solid material whose melting point exceeds the working temperature of welding or a liquid material whose boiling point exceeds the working temperature of welding.

When thus selected, the current lead member material is not destructed in welding.

When a liquid material is chosen for the current lead member, the material is, according to the invention, selected so that its density exceeds that of the slag bath and so that it neither mixes with nor dissolves in the liquid electrode metal.

Such a selection of the material precludes contamination of the weld metal with the current lead member material in the course of welding.

A modification of the electroslag welding apparatus is preferable, wherein the electrode has internal passages disposed along and across the electrode, filled with a gas-conducting material, and communicating with a similar passage in the metal mould bottom plate.

The provision of such passages permits removal of gases from the weld pool in the course of welding, while filling the passages with a gas-conducting material prevents the weld pool from flowing out of the gap between the edges being weld-joined.

BRIEF DESCRIPTION OF DRAWINGS

The invention will now be explained in greater detail with reference to the accompanying drawings, in which:

FIG. 3 illustrates the process of holding the liquid weld metal on a high-temperature hearth, according to the invention, after switching off the welding current; and FIG. 4 shows the obtained weld after crystallization.

BEST MODE OF CARRYING OF THE INVENTION

The invention is explained by way of specific examples.

EXAMPLE 1

Electroslag welding of workpieces was carried out in an apparatus which was prepared for welding by the following procedure.

Figure 1:
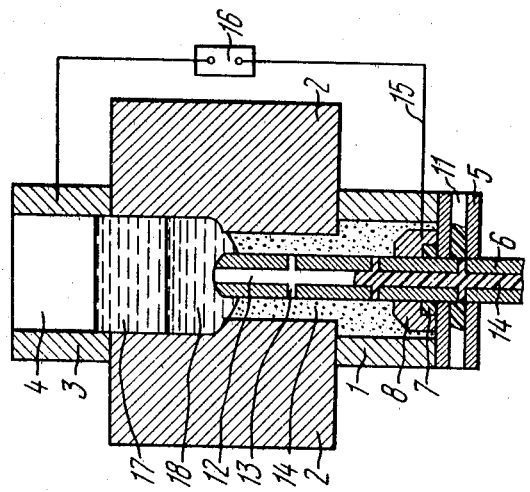
FIG. 1 illustrates the process of electroslag welding of light metals and alloys according to the invention, with a solid current lead member.

50×100-mm section, 500 mm long aluminium specimens 2 (FIG. 1) to be welded together were placed on a metal mould 1 so that the gap between the edges to be weld-joined was of 60 mm; the specimens were isolated from the metal mould.

Graphite run-on plates 3 were installed on the specimens 2. The gap between the edges to be weld-joined was closed at the sides by moulding shoes 4 isolated from the specimens 2 to be welded.

An aluminium welding electrode 6, of 20×40 mm in section, was inserted through an aperture in the centre of a bottom plate 5 into the gap between the edges to be weld-joined.

The aperture wherethrough the welding electrode 6 had been inserted was sealed with an asbestos cord 7.

Next, a graphite current lead member 8 was installed around the welding electrode 6 and seal 7 on the bottom plate 5 inside the metal mould 1.

The bottom plate 5 and the electrode 6 were provided with internal passages 11, 12, 13 for gases to escape from the weld pool in the course of welding, the passages being filled with a mixture of a finely divided metal material and a coarse-grained flux 14 to prevent the weld pool from flowing out through the passages.

Proceeding from the consideration that the melting point of the flux 14 for producing the bath must exceed that of the metal being welded (660° C.), the following flux composition was selected (in wt.%):

| | |
|---|---|
| barium fluoride | 60.0 |
| calcium fluoride | 15.0 |
| lithium fluoride | 5.0 |
| sodium fluoride | 10.0 |
| potassium fluoride | 10.0 |

The density of the flux was of 3.1 g/cm$^3$, and the melting point, of 900° C.

The flux 14 so selected was filled into the gap between the specimens 2 to be welded so that the top part of the welding electrode 6 was left exposed for 10 mm.

The run-on plates 3 and the welding electrode 6 were connected by current feeding cables 15 to a welding transformer 16.

Next, a flux melted beforehand was poured over the flux 14 filled in the gap between the edges to be weld-joined.

The apparatus to accomplish the method for electroslag welding of workpieces was thus prepared for operation.

The welding conditions were as follows:

| | |
|---|---|
| power source no-load voltage | $U_{n.1} = 38$ V; |
| welding current | $I_w = 4.5$ kA. |

Upon completion of the welding circuit, the edges being weld-joined of the specimens 2 and the welding electrode 6 fused, giving rise to a metal pool 17, while the flux melted and formed a slag bath 18; the metal pool 17 was protected from the atmospheric effects by an inert gas, argon.

In the course of welding, the welding electrode 6 fused down and filled with metal the gap between the edges being weld-joined until the fused end of the welding electrode 6 had come to a position below the top face of the current lead member 8.

With such a disposition of the welding electrode 6, its fusion slowed down due to shifting of the arc spot from the electrode end to the top face of the current lead member 8; this in turn caused the electrode end to rise above the top face of the current lead member 8, i.e. a self-regulation of the rate of fusion of the electrode 6 in the course of welding took place.

The gases evolved in the course of welding from the weld pool escaped via the passages 11, 12, 13 of of the welding electrode 6 and bottom plate 5.

After the gap between the edges being weld-joined of the specimens 2 got filled with the molten metal 17, the welding current was switched off.

The slag bath 18 solidified to form a high-temperature hearth 19 with a temperature of 900° C.

The temperature of the hearth 19 and of the liquid metal 17 lowered from 900° C. to the solidification temperature of the metal 2 being welded, i.e. to 660° C., in 1.5 min. Over this time, the metal pool 17 remained liquid, which promoted the maximum removal of gases from the weld metal. The weld metal degassing took 1.2 min (the metal pool degassing time was determined experimentally before the welding).

After the liquid metal had solidified, a welded joint with a sound weld metal was obtained.

The weld metal strength was of 90–92% of that of the metal being welded, which exceeds similar characteristics for the prior art method.

The metallographic analysis demonstrated that the weld metal was free of pores.

Figure 2:
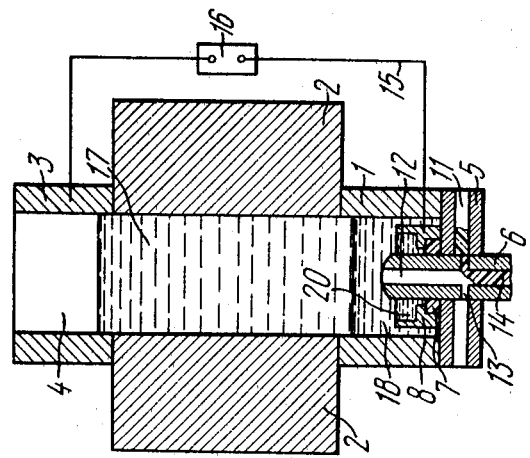
FIG. 2 illustrates the same as FIG. 1, but with a liquid current lead member.

The solid-material current lead member 8 may be substituted by a liquid-material current lead member 20 (FIG. 2). The welding process in the latter case is the same as in the above Example.

Examples 2, 3, 4 and 5 were similar in the procedure to Example 1; the parameters for the Examples are given in the Table below.

Electroslag welding in Examples 2 and 3 yielded welded joints with a sound weld metal having a strength of 90.0 and 75.0% respectively of that of the metal being welded.

The metallographic analysis showed the weld metal to be free from pores.

In Example 4, the weld metal contained solidified slag inclusions, which resulted from a small difference between the densities of the slag and the metal being welded.

| Example No. | Material being welded | Electrode material | Flux composition (in wt. %) | | | | |
|---|---|---|---|---|---|---|---|
| | | | BaF$_2$ | CaF$_2$ | LiF | NaF | KF |
| 2 | Titanium | Titanium | 90.0 | 5.0 | 2.0 | 2.0 | 1.0 |
| 3 | Magnesium | Magnesium | 75.0 | 10.0 | 3.0 | 2.0 | 10.0 |
| 4 | Aluminium | Aluminium | 50.0 | 20.0 | 5.0 | 5.0 | 20.0 |
| 5 | Aluminium | Aluminium | 95.0 | 2.0 | 1.5 | 1.0 | 0.5 |

In Example 5, points of a poor fusion of the weld metal with the edges being weld-joined were observed, which stemmed from an inadequate activity of the flux.

The Examples given above allow to draw a conclusion that electroslag welding in accordance with the proposed method with the use of the proposed flux composition and apparatus yields a sound weld metal featuring high mechanical properties.

The Examples given above do not restrict the range of metals being welded, since the method of the invention with the use of the flux and apparatus of the invention will yield sound welded joints in welding metals whose density is less than that of the welding flux.

INDUSTRIAL APPLICABILITY

The invention may be employed in welding aluminium, magnesium, titanium, their alloys, and other light metals; it is particularly useful for welding aluminium busbars in the nonferrous metallurgy, chemical and electrical industries, and in other fields of engineering.

We claim:

1. A method for electroslag welding of light metals and alloys comprising
   establishing a slag bath having a heat capacity sufficient to maintain weld metal in its liquid state for a period of time 10–15% longer than that required to fully degas said weld metal;

fusing an electrode by application of a welding current to produce weld metal in a liquid state;
filling a gap between said light metals and alloys to be welded with said weld metal in a liquid state; and
switching off said welding current.

2. A method as defined in claim 1, wherein the weld metal is held in a liquid state for a time 10–15% longer than that required to fully degas said weld metal.

3. A method as defined in claim 1, wherein the heat capacity of the slag bath is raised by increasing the volume thereof.

4. A method as defined in claim 1, wherein the heat capacity of the slag bath is increased by the use of a flux whose melting point exceeds the melting point of the metal being welded.

5. A flux for electroslag welding, comprising lithium fluoride and sodium fluoride as well as potassium salt, characterized in that it additionally comprises barium fluoride and calcium fluoride, and the potassium salt is potassium fluoride, the components being taken in the following ratio:

| | |
|---|---|
| barium fluoride | 60.0 to 90.0 |
| calcium fluoride | 5.0 to 15.0 |
| lithium fluoride | 1.0 to 5.0 |
| sodium fluoride | 1.0 to 10.0 |
| potassium fluoride | 1.0 to 15.0 |

6. An apparatus for electroslag welding at a working temperature comprising a mold with a bottom plate, molding shoes, a welding electrode, said welding electrode inserted through an aperture in a center of said bottom plate, a current lead member and a slag bath, said current lead member comprising a solid material having a melting point greater than said working temperature of said electroslag welding, having a low electrical resistance, and being installed in a fusion zone of said welding electrode.

7. An apparatus as defined in claim 6, wherein intercommunicating internal gas-discharge passages are provided in the metal mould bottom plate and welding electrode and filled with a gas-passing material.

8. An apparatus as defined in claim 7, characterized in that the internal passage (11) of the bottom plate (5) being disposed along the electrode and communicating with the electrode passages (12) disposed across the electrode over the entire length thereof.

9. An apparatus for electroslag welding at a welding temperature comprising a mold with a bottom plate having a center, molding shoes, a welding electrode, said welding electrode inserted through an aperture in said center of said bottom plate, a current lead member and a slag bath having a density and boiling point, said current lead member made of a liquid material having a boiling point and a density which exceeds said density and boiling point of said slag bath.

* * * * *